United States Patent
Aspuru-Guzik et al.

(10) Patent No.: US 10,346,748 B2
(45) Date of Patent: Jul. 9, 2019

(54) QUANTUM PROCESSOR PROBLEM COMPILATION

(71) Applicant: President and Fellows of Harvard College, Cambridge, MA (US)

(72) Inventors: Alan Aspuru-Guzik, Cambridge, MA (US); Ryan Babbush, Cambridge, MA (US); Bryan O'Gorman, Edison, NJ (US)

(73) Assignee: PRESIDENT AND FELLOWS OF HARVARD COLLEGE, Cambridge, MA (US)

(*) Notice: Subject to any disclaimer, the term of this patent is extended or adjusted under 35 U.S.C. 154(b) by 635 days.

(21) Appl. No.: 14/908,260

(22) PCT Filed: Jul. 25, 2014

(86) PCT No.: PCT/US2014/048121
§ 371 (c)(1),
(2) Date: Jan. 28, 2016

(87) PCT Pub. No.: WO2015/060915
PCT Pub. Date: Apr. 30, 2015

(65) Prior Publication Data
US 2016/0171368 A1    Jun. 16, 2016

Related U.S. Application Data

(60) Provisional application No. 61/859,388, filed on Jul. 29, 2013.

(51) Int. Cl.
G06N 5/02 (2006.01)
G06N 10/00 (2019.01)

(52) U.S. Cl.
CPC .............. *G06N 5/02* (2013.01); *G06N 10/00* (2019.01)

(58) Field of Classification Search
CPC .............................. G06N 5/02; G06N 99/002
See application file for complete search history.

(56) References Cited

U.S. PATENT DOCUMENTS 7,877,333 B2    1/2011  Macready
8,032,474 B2    10/2011 Macready
(Continued)

OTHER PUBLICATIONS

Babbush et al., "Construction of Energy Functions for Lattice Heteropolymer Models: A Case Study in Constraint Satisfaction Programming and Adiabatic Quantum Optimization," Quantum Physics, arXiv.org, Jun. 11, 2013, pp. 1-44.
(Continued)

*Primary Examiner* — Ajay Ojha
(74) *Attorney, Agent, or Firm* — Alexander Akhiezer; Erik Huestis; Foley Hoag LLP

(57) ABSTRACT

Solution of a problem of determining values of a set of N problem variables x, makes use of a quantum processor that has a limited number of hardware elements for representing quantum bits and/or limitations on coupling between quantum bits. A method includes accepting a specification of the problem that includes a specification of a set of terms where each term corresponds to a product of at least three variables and is associated with a non-zero coefficient. A set of ancilla variables, each ancilla variable corresponding to a pair of problem variables, is determined by applying an optimization procedure to the specification of the set of the terms. The accepted problem specification is then transformed according to the determined ancilla variables to form a modified problem specification for use in configuring the quantum processor and solution of problem.

22 Claims, 4 Drawing Sheets

(56) References Cited

U.S. PATENT DOCUMENTS

| | | | |
|---|---|---|---|
| 8,190,548 B2 | 5/2012 | Choi | |
| 8,244,662 B2 | 8/2012 | Coury et al. | |
| 8,348,674 B2 | 1/2013 | Henson | |
| 2003/0023651 A1 | 1/2003 | Whaley et al. | |
| 2010/0306142 A1 | 12/2010 | Amin | |
| 2011/0047201 A1 | 2/2011 | Macready et al. | |
| 2011/0313741 A1 | 12/2011 | Langhoff | |
| 2012/0095943 A1 | 4/2012 | Yankov et al. | |
| 2013/0117200 A1 | 5/2013 | Thom | |
| 2016/0019135 A1* | 1/2016 | Gotlieb | G06F 11/3684 717/124 |
| 2016/0055421 A1* | 2/2016 | Adachi | G06N 5/003 706/46 |
| 2017/0351967 A1* | 12/2017 | Babbush | G06N 99/002 |

OTHER PUBLICATIONS

Biamonte, "Non-Perturbative K-Body to Two-Body Commuting Conversion Hamiltonians and Embedding Problem Instances into Ising Spins," Quantum Physics, arXiv.org, May 29, 2008, pp. 1-9.

Boros et al., "Pseudo-Boolean Optimization," Research Report, Oct. 15, 2001, pp. 1-83.

Choi, "Minor-Embedding in Adiabatic Quantum Computation: I. The Parameter Setting Problem," Quantum Physics, arXiv.org, Apr. 30, 2008, pp. 1-17.

Choi, "Minor-Embedding in Adiabatic Quantum Computation: II. Minor-Universal Graph Design," Quantum Physics, arXiv.org, Jan. 19, 2010, pp. 1-10.

Perdomo et al., "On the Construction Model Hamiltonians for Adiabatic Quantum Computation and its Application to Finding Low Energy Conformations of Lattice Protein Models," Quantum Physics, arXiv.org, May 16, 2008, pp. 1-35.

Glover et al, "Polynomial Unconstrained Binary Optimisation—Part I," Int. J. Metaheuristics, vol. 1, No. 3, 2011.

Babbush et al., "Resource Efficient Gadgets for Compiling Adiabatic Quantum Optimization Problems," arXiv:1307.8041v1, Jul. 30, 2013, pp. 1-11.

Faybusovich, "A Hamiltonian Formalism for Optimization Problems," Journal of Mathematical Systems, Estimation and Control, vol. 5, No. 3 (1995) pp. 1-13.

Nagaj, "Local Hamiltonians in Quantum Computation," arXiv:0808. 2117v1 [quant-ph], Aug. 15, 2008, pp. 1-181.

Roland et al., "Quantum Search by Local Adiabatic Evolution," arXiv:quant-ph/0107015v1, Jul. 3, 2001, pp. 1-4.

* cited by examiner

QUANTUM PROCESSOR PROBLEM COMPILATION

CROSS REFERENCE TO RELATED APPLICATIONS

This application is a National Stage of International Application No. PCT/US2014/048121 filed on Jul. 25, 2014, which claims priority to U.S. Provisional Application No. 61/859,338, filed on Jul. 29, 2013, the contents of which are hereby incorporated by reference in their entirety.

STATEMENT AS TO FEDERALLY SPONSORED RESEARCH

This invention was made with government support under contract M1144-201167-DS awarded by the United States Department of Defense. The government has certain rights in the invention.

BACKGROUND

This invention relates to solving optimization problems using quantum computer.

Quantum computers have been applied to solution of binary optimization using adiabatic quantum computation, for instance, quantum annealing. An example of such an approach, and a physical realization of a quantum computer to host such an approach is described in US Pat. Pub. 2010/0306142, titled "Methods for Adiabatic Quantum Computation." This publication, and below referenced patent publications and/or issued patents, are incorporated herein by reference.

A class of binary optimization problems referred to as Polynomial Unconstrained Binary Optimization (PUBO) seeks to find an assignment $x \in \mathbb{B}^N$, where $\mathbb{B} = \{0,1\}$, such that $f(x)=\min[f(\mathbb{B}^N)]$. The function $f(x)$ has a unique representation as $$f(x) = \sum_{S \subseteq \{1,\ldots,N\}} c_S \prod_{i \in S} x_i$$

The coefficients $c_S$ essentially specify $f$. These coefficients also specify a Hamiltonian $H(f)$. At least some such Hamiltonians may be used to configure a quantum computer (i.e., a physical machine), yielding an electronic solution of the assignment problem corresponding to the Hamiltonian. In at least some implementations and configurations of a quantum computer, each problem variable $x_i$ corresponds to a physical element of the quantum computer. The physical (quantum) state of each element is represented as having two basis elements (corresponding to $x_i=0$ and $x_i=1$) and the (complex) coefficient characterize the physical state of the element. Therefore for N variables $x_i$ there are 2N complex variables that characterized the physical state of the corresponding elements of the quantum computer. The Hamiltonian represents an operator on the set of the quantum states of the computer elements, which through physical coupling of elements of the computer defines a physical time evolution of the states. When the operators $q_i$ of a Hamiltonian $$H(f) = \sum_{S \subseteq \{1,\ldots,N\}} c_S \prod_{i \in S} q_i$$

are coupled with the same coefficients $c_S$ as the $x_i$ are coupled in $f(\ )$, then the vector x that minimizes $f(\ )$ corresponds to an eigenvector of the Hamiltonian and the physical computer physically maintains that state.

In practice, there may a number of constraints on the Hamiltonians that can be used to configure a quantum computer. First, the maximum degree of coupling may be limited, for instance, to two, such that there each subset S has at most two elements, such that $$H(f) = \sum_{1 \leq i \leq j \leq N} a_{ij} q_i q_j.$$

Such Hamiltonians are referred to as "2-local." In some hardware implementations of quantum computer, a graph whose nodes represent variables $x_i$ and links represent pairs of variables that are constrained by non-zero coupling coefficients $\alpha_{ij}$ is embedded in a hardware based graphs that implements the constraints. An example of such an approach to graph embedding is described in U.S. Pat. No. 8,244,662, titled "Graph Embedding Techniques." A second constraint of certain quantum computers is on the precision or range of values $c_S$ that may be represented in configuration of the hardware. For example, certain quantum computers are limited to a precision range of 16 values (e.g., ±1, . . . , ±8). A third constraint is that a quantum computer is generally limited in the number of variables $x_i$, each corresponding to a quantum bit represented in a corresponding hardware element in the quantum computer.

In order to apply a quantum computer to a problem that is specified by a k-local form, where k>2 (e.g., k=3), one approach is to introduce ancilla variables. For example, one approach is to transform a 3-local specification on a set of variables $x_1$ to $x_N$, by introducing a set of ancilla variables $x_{ij}$, each corresponding to a pair of variables $x_i$ and $x_j$. In this way, terms of the form $x_i x_j x_k$ may be replaced with quadratic terms $x_{ij} x_k$. In some examples, the problem variable pairs to combine to form the ancilla variables are selected at random.

However, in general, introduction of ancilla variables can easily cause the total number of variables and/or the required precision of the coupling coefficients to exceed the capacity of the quantum computer.

SUMMARY

There is a need configure a quantum computer to solve a 3-local (or more generally k-local for k=3, 4, or >4) optimization within the hardware capacity for number of variables and/or available precision of coupling coefficients. For example, arbitrary introduction of ancilla variables may achieve the technical requirement of conversion of a problem to a 2-local form, but that converted form may exceed the number of variables that can be supported by the quantum computer hardware or require a precision that exceeds the available precision of the quantum computer.

In one aspect, in general, a method is for use in solution of a problem of determining values of a set of N problem variables $x_i$ by a quantum processor that has a limited number of hardware elements for representing quantum bits and/or limitations on coupling between quantum bits. The method includes accepting a specification of the problem that includes a specification of a set of terms where each term corresponds to a product of at least three variables and is associated with a non-zero coefficient. A set of ancilla variables, each ancilla variable corresponding to a pair of problem variables, is determined by applying an optimization procedure to the specification of the set of the terms. The accepted problem specification is then transformed according to the determined ancilla variables to form a modified problem specification for use in configuring the quantum processor and solution of problem.

Aspects may include one or more of the following features.

The modified problem is solved using the quantum processor using an adiabatic quantum annealing approach.

The optimization procedure includes a set covering procedure in which a minimal set of variable pairs cover all the terms of the set of terms. In some examples, applying the optimization procedure includes applying an Integer Linear Programming (ILP) procedure. In some examples, applying the optimization procedure includes applying a greedy procedure to determine successive ancilla variables.

Applying the optimization procedures includes selecting the ancilla variables to limit (e.g., to minimize) a required precision required for solution of the modified problem.

In some examples, multiple ancilla variables are determined for at least some of the problem variable pairs. For instance, three ancilla variables are determined for at least some problem variable pairs.

The problem comprises a Polynomial Binary Optimization Problem (PUBO).

In another aspect, a specification compiler (e.g., software including instructions for causing a computer to perform the transformation of the problem specification outlined above) is used to configure a programmable computer, which then implements the transformation procedure from a problem specification to a computing specification suitable for application on a quantum computer.

In another aspect, in general, the approach to forming the modified problem specification is applied to solution on the problem using a digital implementation of an annealing processor.

One or more of the approaches described in this application address a technical problem stemming from limitations on the form of problem specifications that may be handled by quantum computers that have limitations on the number of qubits, the coupling between qubits (e.g., a limitation that coupling is 2-local), and the precision of coupling. A solution provided herein addressed this technical problem by transforming an initial problem specification according to technical considerations regarding how this transformation is performed, for example, according to which subsets of variables should be represented as ancilla variables that are then physically realized as qubits in the quantum computer hardware elements. These technical considerations are incorporated into the optimization of the selection, for example, as represented in an Integer Linear Programming or a Greedy selection approach.

Other features and advantages of the invention are apparent from the following description, and from the claims.

DESCRIPTION

Figure 1:
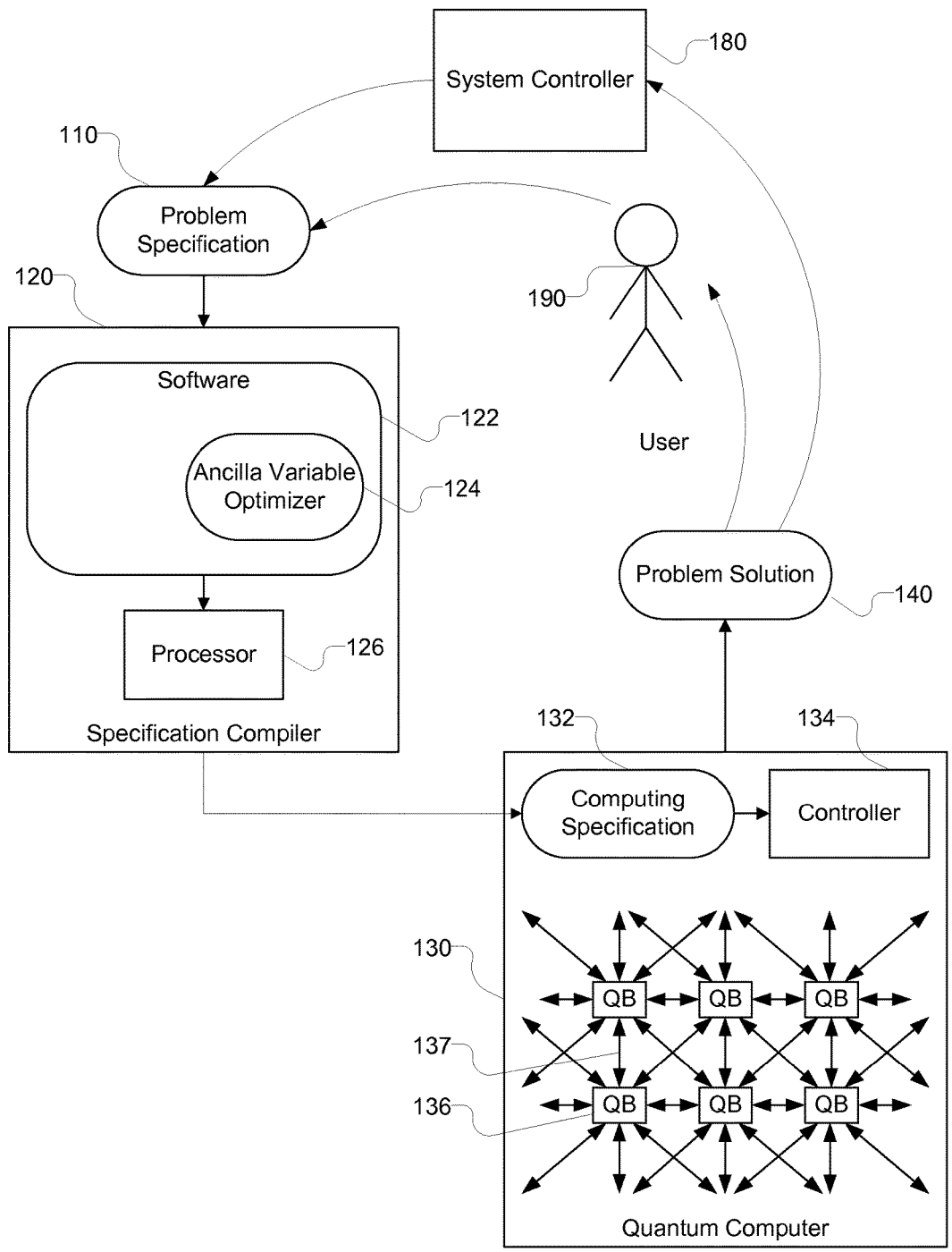
FIG. 1 is a block diagram of a computing system.

Referring to FIG. 1, one context for solution of a problem uses a quantum computer. The quantum computer 130 has a number of hardware elements (QB) 136 that are used to represent the qubits of the quantum computation, and has hardware control elements 137 that provide configurable and controllable coupling between the qubits. These control elements can be used to control the Hamiltonian according to which the qubits evolve over time, and in particular, can be used to control a time variation of the Hamiltonian in an adiabatic annealing operation. Generally, in some examples, this quantum computer is used in the solution of a problem, for example, a binary optimization problem or an assignment problem (e.g., assignment of physical resources), whose specification is provided by a user, or in some alternatives is provided as the output of a system controller 180 (e.g., a computing system) that forms the problem specification from another representation of the problem. This problem specification does not, however, necessarily meet the limitations of the computing specification 132 that may be directly addressed by the quantum computer. In particular, in this example, the computing specification requires a 2-local form of problem specification while in this example, the problem specification is 3-local (or in some examples 4-local or higher).

The approaches described below are based on transformations of the problem specification to form the computing specification prior to control of the quantum computer according to the computing specification. These transformations may be considered somewhat analogous to the compilation of a high-level computing language to form an assembly language specification, which can then be further processed before execution on a digital computer.

The transformation of the problem specification to form the computing specification is implemented on a digital computer having a processor 126 as well as program memory, referred to in FIG. 1 as the Specification Compiler 120. The processing of the problem specification according to the procedures described in this application makes use of software 122, which includes processor instructions stored on a non-transitory computer-readable medium accessible by the Specification Compiler processor. As discussed in the Summary and below, the software includes software 124 for optimizing a set of ancilla variables that are introduced into the problem specification to form the computing specification.

It should be understood that the output of the Specification Compiler is not necessarily directly in a form for control of the hardware in the quantum computer. For example, as discussed in the Background, further transformations, for example based on graph embedding, may be performed on the output of the Specification Compiler before the quantum computer controller can use the result for controlling the quantum computer hardware. As discussed above, the computing specification may be processed further to determine characteristics of physical coupling between hardware elements (i.e., the qubits) of the quantum computer so that the time evolution of the state of the hardware elements configured based on the computing specification is used to determine the problem solution. In the case in which the problem specification represents a physical problem (e.g., an assignment problem), the user or the system controller may used the problem solution provided by the quantum computer to implement a physical solution to based on the problem solution.

As outlined above, the general procedure implemented by the Specification Compiler takes a problem specification of an problem, for example, an binary assignment problem, in the form of a coefficients for a polynomial $f(x)$, which in this example, includes coefficients of terms of the form $x_i x_j x_k$. In at least some embodiments, M (e.g., M=1, M=3) ancilla variables $x_{ij}^{(m)}$ are introduced for each pair of a selected subset of variable pairs $(x_i, x_j)$. This selection is not arbitrary or random. Rather, these pairs are selected according to one or both of the considerations of (a) the total number of variables, for example, so that the number does not exceed the number of qubit hardware elements in the quantum computer, and/or (b) limiting the range ("precision") of the coefficients, which represent degrees of coupling between the qubit representations of the variables in the quantum computer.

More specifically, one or more of the embodiments apply exact classical gadgets. In order to efficiently reduce locality, many-body terms are collapsed in a systematic fashion that takes into account the appearance of specific pairs of qubits in multiple higher-order terms. For applications in which qubits are the limiting resource, we show below how to map the optimal reduction to set cover and 0-1 integer linear programming (ILP) so that conventional solvers can be leveraged to quickly find the best encoding. For control precision limited problems we formalize the optimal reduction problem and provide a greedy algorithm that significantly outperforms the status quo.

Figure 2:
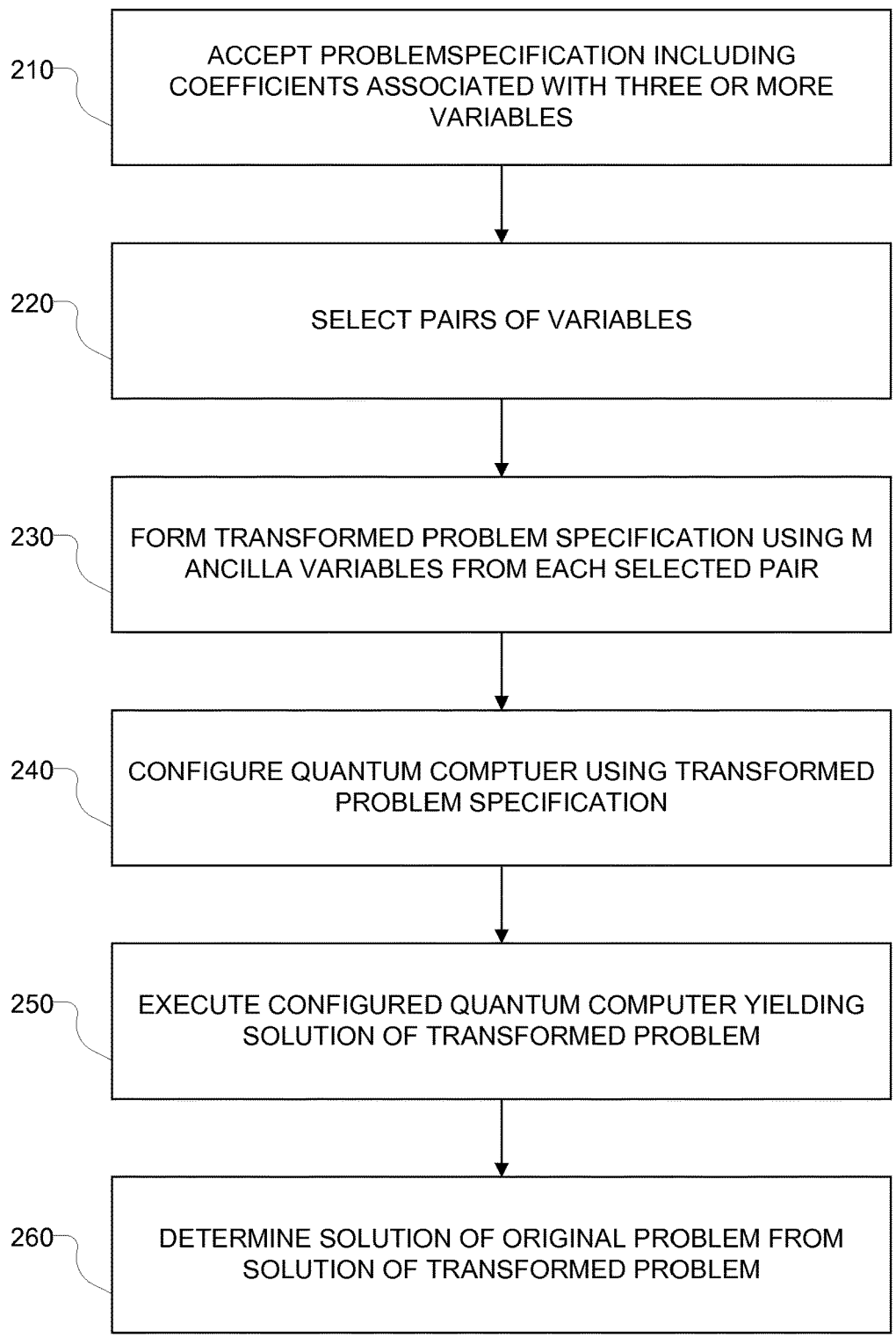
FIG. 2 is a flowchart.

Referring to FIG. 2, as well as FIG. 1, the overall process generally follow a number of steps. First, the problem specification 110 is accepted by the specification compiler 120, for example from a user 190 or a system controller 180 (step 210). The problem specification 110 includes at least some coefficients that are associated with three or more variables each. The specification compiler identifies a number of pairs of variables (step 220). As introduced above and discussed in more detail below, there are a number of alternative approaches to perform this selection. Some approaches are directed to the technical problem of keeping the total number of variables (including added ancilla variables) within a bound (e.g., the hardware capacity of the quantum computer), while other approaches are directed to the technical problem of limiting the coefficient precision required (e.g., to within the precision supported by the quantum computer). Based on the selection of pairs of original variables, the originally accepted problem specification 110 is transformed by introducing M ancilla variables for each selected pair of original variables (step 230). In some approaches, M=1, while in other approaches M=3, but it should be understood that there are yet other approaches that may introduce different numbers of ancilla variables per pair. Having formed the transformed computing specification, the quantum computer 130 is configured according to that specification. The quantum computer is then operated (i.e., under the control of a controller 134 according to the specification 132) until a problem solution 140 is obtained (step 250). Finally, a solution to the original problem is determined from the solution 140 of the transformed problem (step 260).

In order to compile NP-hard optimization problems into an experimental Hamiltonian, the problem of interest is encoded into a graph of binary variables with physically realizable interactions. Perhaps the simplest model of interacting binary variables is Polynomial Unconstrained Binary Optimization (PUBO): given a pseudo-Boolean function $f$: $\mathbb{R}^N \to \mathbb{B}$, find an assignment $x \in \mathbb{R}^N$ such that $f(x) = \min[f(\mathbb{B}^N)]$ where $\mathbb{B} = \{0,1\}$. Every pseudo-Boolean $f$ has a unique multi-linear polynomial representation $$f(x) = \sum_{S \subseteq \{1,\ldots,N\}} c_S \prod_{i \in S} x_i, \tag{1}$$

where $c_S \in \mathbb{R}$. From this expression we can construct an optimization Hamiltonian that embeds the energy landscape of a given PUBO in its eigenspectrum, $$H(f) = \sum_{S \subseteq \{1,\ldots,N\}} c_S \prod_{i \in S} q_i, \tag{2}$$

acting on N qubits, where $$q_i = \frac{1}{2}(I - Z_i)$$

and $Z_i$ is the Pauli matrix $\sigma^z$ acting on the i th qubit, i.e.

$$Z_i = I^{\otimes (i-1)} \otimes \sigma^z \otimes I^{\otimes (N-i)}, \tag{3}$$

where I is the one-qubit identity operator. Note that while we write $H(f)$ for convenience, in practice $f$ will be specified by its coefficients $c_S$. Every element $|x\rangle$ of the computational basis is an eigenstate of $H(f)$ with eigenvalue $f(x)$. Specifically, the ground state of $H(f)$ is spanned by the set of states $|x\rangle$ such that $f(x) = \min[f(\mathbb{B}^N)]$.

However, experimental interactions using a quantum computer are typically limited to pairwise couplings between qubits, allowing Hamiltonians of the form $$H(f) = \sum_{1 \leq i \leq j \leq N} \alpha_{ij} q_i q_j, \tag{4}$$

where $\alpha_{ij} \in \mathbb{R}$. The case in which the indices are equal is used to include 1-local terms: $q_i q_i = q_i$. Such Hamiltonians correspond to a second-order pseudo-Boolean $f$, $$f(x) = \sum_{1 \leq i \leq j \leq N} \alpha_{ij} x_i x_j. \tag{5}$$

Thus, to encode a general instance of PUBO into an experimentally realizable Hamiltonian, one reduces the problem to Quadratic Unconstrained Binary Optimization (QUBO), defined analogously to PUBO with the restriction that the pseudo-Boolean function to be minimized is quadratic. In practice, many common optimization problems have been reduced to PUBO in such a way that the pseudo-Boolean function to be minimized is cubic, i.e. of the form $$f(x) = \sum_{1 \leq i \leq j \leq N} \alpha_{ij} x_i x_j + \sum_{1 \leq i < j < k \leq N} \alpha_{ijk} x_i x_j x_k.$$

It is therefore desirable to have a general method for reducing a cubic function $f: \mathbb{R}^N \to \mathbb{B}$ to a quadratic function $f': \mathbb{R}^{N'} \to \mathbb{B}$ in such a way that an assignment $x \in \mathbb{R}^N$ that minimizes $f$ can be efficiently computed given an assignment $x'$ that minimizes $f'$, where $N'$ is a polynomial function of N. One family of methods employs a set of $N'-N$ ancilla variables $\{y_1, \ldots, y_{N'-N}\} \in \mathbb{R}^{N'-N}$ such that if $(x_1, \ldots, x_N, y_1, \ldots, y_{N'-N})$ minimizes $f'$, then $(x_1, \ldots, x_N)$ minimizes $f$. That is, a minimizing assignment $(x_1, \ldots, x_N)$ of $f$ is directly encoded in the N computational qubits of a ground state $|x_1 \ldots x_N y_1 \ldots y_{N'-N}\rangle$ of $H(f')$. In the methods examined here, each ancilla variable corresponds to a pair of computational variables (i, j) and so for convenience is denoted by $x_{ij}$ or $x_{ij}^{(m)}$.

Integral to the exact gadget is the penalty function $$s(x,y,z)=3z+xy-2xz-2yz, \quad (6)$$

with the important property that $s(x, y, z)=0$ if $xy=z$ and $s(x, y, z) \geq 1$ if $xy \neq z$, as shown in Table 1, below. While s is not the only quadratic ternary pseudo-Boolean with this property, we show that it is optimal for our purposes.

| x | y | z | s(x, y, z) |
|---|---|---|---|
| 0 | 0 | 0 | 0 |
| 0 | 1 | 0 | 0 |
| 1 | 0 | 0 | 0 |
| 1 | 1 | 1 | 0 |
| 0 | 0 | 1 | 3 |
| 0 | 1 | 1 | 1 |
| 1 | 0 | 1 | 1 |
| 1 | 1 | 0 | 1 |

In our reductions, we replace a part $x_i x_j$ of a 3-local term $x_i x_j x_k$ with $x_{ij}$, where $x_{ij}$ is an ancilla variable, thereby reducing locality, while simultaneously adding the penalty function $s(x_i, x_j, x_{ij})$, scaled by an appropriate factor to ensure that the value of the reduced form is greater if $x_{ij} \neq x_i x_j$ than it is if $x_{ij} = x_i x_j$, for any assignment of the computational variables. In this way, we ensure that if an assignment of the computational and ancilla variables minimizes the reduced form, then that assignment of the computational variables also minimizes the original form. Consider the reduction $$\alpha_{ijk} x_i x_j x_k \rightarrow \alpha_{ijk} x_{ij} x_k + (1+|\alpha_{ijk}|)s(x_i,x_j,x_{ij}) \quad (7)$$

If $x_{ij}=x_i x_j$, then $s(x_i,x_j,x_{ij})=0$ and the reduced form simplifies to the unreduced form $\alpha_{ijk} x_i x_j x_k$. If $x_{ij}=1-x_i x_j$, then $s(x_i,x_j, 1-x_i x_j)=3-2x_i-2x_j+2x_i x_j$ and the reduced form always has a greater value than it does if $x_{ij}=x_i x_j$. That is, $$\alpha_{ijk}(1-x_i x_j)x_k+(1+|\alpha_{ijk}|)s(x_i,x_j,1-x_i x_j) > \alpha_{ijk}(x_i x_j)x_k+(1+|\alpha_{ijk}|)s(x_i,x_j,x_i x_j)=\alpha_{ijk} x_i x_j x_k \quad (8)$$

for all $x_i$, $x_j$, and $x_k$.

To decrease the number of ancilla variables needed to reduce many 3-local terms, it is advantageous to use the same ancilla variable $x_{ij}$ to reduce more than one 3-local term. Let $K_{ij}$ be the set of indices k such that the term $x_i x_j x_k$ is reduced using the ancilla variable $x_{ij}$ corresponding to the pair of variables $\{x_i, x_j\}$. Each non-zero 3-local term is reduced using exactly one ancilla, and so we must choose $\{K_{ij}\}$ such that for each $\alpha_{ijk} \neq 0$, there is exactly one pair of indices $\{w, v\}$ with $\{w, v, K_{wv}\}=\{i, j, k\}$. (Note that the indices on the coefficients are unordered, e.g. $\alpha_{ijk}=\alpha_{kji}=\alpha_{jki}$.) Then the entire set of 3-local terms can be reduced by $$\sum_{1 \leq i<j<k \leq N} \alpha_{ijk} x_i x_j x_k = \sum_{1 \leq i<j \leq N} \sum_{k \in K_{ij}} \alpha_{ijk} x_i x_j x_k \rightarrow \sum_{1 \leq i \leq j \leq N} \sum_{k \in K_{ij}} (\alpha_{ijk} x_{ij} x_k + (1+|\alpha_{ijk}|)s(x_i, x_j, x_{ij})), \quad (9)$$

where the single term reduction in Eq. (7) is applied to every term in the rewritten original expression. The essential conditions (that, for any i and j for which an ancilla variable is used, the value of the reduced form is greater if $x_{ij} \neq x_i x_j$ than the value thereof if $x_{ij}=x_i x_j$ and in the latter case the reduced form is equal to the original form) are preserved by linearity. We explain below a method for choosing which pair of variables to use to reduce each 3-local term (i.e. for choosing $K_{ij}$ with the constraints given) in a way that minimizes the total number of ancilla variables (the number of non-empty $K_{ij}$). This strategy can be generalized as discussed below to minimize the number of ancilla required in 4-local to 2-local reductions.

It is often the case that the limiting factor in encoding a PUBO instance into experimentally realizable form is the control precision rather than the number of qubits available. Existing hardware is able to implement 2-local Hamiltonians of the form in Eq. (4) such that the coefficients are integral multiples of a fixed step size $\Delta_\alpha$ with a maximum magnitude of $N_\alpha \Delta_\alpha$, where $N_\alpha$ is the control precision. An arbitrary 2-local Hamiltonian can be made to have coefficients that are integral multiples of $\Delta_\alpha$ by dividing them all by their greatest common divisor and multiplying by $\Delta_\alpha$. The control precision needed for an arbitrary instance is thus the quotient of the greatest magnitude of the coefficients and their greatest common divisor. We assume without loss of generality that the coefficients of the PUBO to be reduced are integers and structure the reductions so that the reduced QUBO also has integral coefficients. The greatest common divisor of the coefficients of the reduced QUBO is thus one with high probability, and the control precision needed is the greatest magnitude of the coefficients. As a preliminary, we show that s as defined is optimal in that the greatest coefficient (3) cannot be reduced any further.

Suppose $f(x_1,x_2,x_3)$ is a quadratic pseudo-Boolean function with integer coefficients (i.e. in the form of Eq. (5)) such that $f(x_1,x_2,x_3)=0$ if $x_3=x_1 x_2$ and is at least one otherwise. First note that $f(0, 0, 0)=0$ and thus that $f(1, 0, 0)=\alpha_{11}=0$ and $f(0,1,0)=\alpha_{22}=0$. Because $f(1,1,1)=\alpha_{33}+\alpha_{12}+\alpha_{13}+\alpha_{23}=0$, $\alpha_{33}+\alpha_{23}=-\alpha_{12}-\alpha_{13}$, and so $f(0,1,1)=\alpha_{33}+\alpha_{23}=-\alpha_{12}-\alpha_{13} \geq 1$, which implies $\alpha_{13} \leq -\alpha_{12}-1$. Because $\alpha_{12}=f(1,1,0) \geq 1$, $\alpha_{13} \leq -2$. Finally, $f(1,0,1)=\alpha_{33}+\alpha_{13} \geq 1$ and so $\alpha_{33} \geq 1-\alpha_{13} \geq 3$.

For each i and j in the reduction shown in Eq. (9), $(1+|\alpha_{ijk}|)s(x_i,x_j,x_{ij})$ is added for each $k \in K_{ij}$, and so the coefficients in $s(x_i,x_j,x_{ij})$ are multiplied by $\sum_{k \in K_{ij}}(1+|\alpha_{ijk}|)$. We claim that this factor can be decreased using the reduction $$\sum_{k \in K_{ij}} \alpha_{ijk} x_i x_j x_k \rightarrow \sum_{k \in K_{ij}} \alpha_{ijk} x_{ij} x_k + \delta_{ij} s(x_i, x_j, x_{ij}), \quad (10)$$

where $$\delta_{ij} = 1 + \max\left\{ \sum_{k \in \{k \in K_{ij}|\alpha_{ijk}>0\}} \alpha_{ijk}, \sum_{k \in \{k \in K_{ij}|\alpha_{ijk}<0\}} -\alpha_{ijk} \right\},$$

for each i and j. For all $x_i, x_j$, and $\{x_k | k \in K_{ij}\}$, $$\sum_{k \in K_{ij}} \alpha_{ijk}(1-x_i x_j)x_k + \delta_{ij} s(x_i, x_j, 1-x_i x_j) > \sum_{k \in K_{ij}} \alpha_{ijk}(x_i x_j)x_k + \delta_{ij} s(x_i, x_j, x_i x_j). \quad (11)$$

That is, for any assignment of the computational variables, the value of the reduced form is greater if the ancilla variable $x_{ij} \neq x_i x_j$ than it is if $x_{ij}=x_i x_j$. The $\delta_{ij}$ given in Eq. (10) is optimal in the sense that it requires the least control precision of all possibilities which satisfy the appropriate conditions. Consider the reduced form $$x_{ij} \sum_{k \in K_{ij}} \alpha_{ijk} x_k + \delta s(x_i, x_j, x_{ij}) \qquad (12)$$

for some $\delta \in \mathbb{Z}$ to be determined. We guarantee that $$(1 - x_i x_j) \sum_{k \in K_{ij}} \alpha_{ijk} x_k + \delta s(x_i, x_j, 1 - x_i x_j) > \qquad (13)$$

$$x_i x_j \sum_{k \in K_{ij}} \alpha_{ijk} x_k + \delta s(x_i, x_j, x_i x_j)$$

for all $x_i, x_j$, and $\{x_k | k \in K_{ij}\}$. For $x_i=1$ and $x_j=0$ or $x_i=0$ and $x_j=1$, this inequality simplifies to $$\delta > -\sum_{k \in K_{ij}} \alpha_{ijk} x_k, \qquad (14)$$

for $x_i = x_j = 1$ it simplifies to $$\delta > \sum_{k \in K_{ij}} \alpha_{ijk} x_k, \qquad (15)$$

and for $x_i = x_j = 0$ it simplifies to $$\delta > -\frac{1}{3} \sum_{k \in K_{ij}} \alpha_{ijk} x_k. \qquad (16)$$

Eq. (16) is implied by Eq. (14) and so it is sufficient to ensure that Eq. (14) and Eq. (15) are satisfied. We see that the term $-\Sigma_{k \in K_{ij}} \alpha_{ijk} x_k$ is greatest when $$x_k = \begin{cases} 1 & \text{if } \alpha_{ijk} < 0 \\ 0 & \text{if } \alpha_{ijk} > 0 \end{cases}, \qquad (17)$$

and so if and only if $$\delta > \sum_{k \in \{k \in K_{ij} | \alpha_{ijk} < 0\}} -\alpha_{ijk}, \qquad (18)$$

then Eq. (14) is satisfied for all $\{x_k | k \in K_{ij}\}$. The term $\Sigma_{k \in K_{ij}} \alpha x_k$ is greatest under the exact opposite conditions as Eq. (17). Thus, if and only if $$\delta > \sum_{k \in \{k \in K_{ij} | \alpha_{ijk} > 0\}} \alpha_{ijk} \qquad (19)$$

then Eq. (15) is satisfied for all $\{x_k | k \in K_{ij}\}$. Together, Eq. (18) and Eq. (19) and imply that $$\delta > \max \left\{ \sum_{k \in \{k \in K_{ij} | \alpha_{ijk} > 0\}} \alpha_{ijk}, \sum_{k \in \{k \in K_{ij} | \alpha_{ijk} < 0\}} -\alpha_{ijk} \right\}. \qquad (20)$$

Note that the terms introduced in Eq. (10) only appear in the reduction for that pair (i, j), and so the coefficient for a term therein is the coefficient in the total reduced form, with the exception of $x_i x_j$ which may also appear in the original unreduced form, which is to be addressed later. The greatest term introduced in Eq. (10) is $3\delta_{ij}$, which greatly increases the control precision needed.

Below, we introduce an alternative method that adds terms whose greatest coefficient is approximately a third of this. Because the complexity of the final form obscures the simplicity of the method, we begin with a special case and extend it gradually to the general case. To reduce a single term whose coefficient is divisible by three, we introduce three ancillary bits and penalty functions:

$$\alpha_{ijk} x_i x_j x_k \to \frac{\alpha_{ijk}}{3} (x_{ij}^{(1)} + x_{ij}^{(2)} + x_{ij}^{(3)}) x_k + \left(1 + \left|\frac{\alpha_{ijk}}{3}\right|\right) \sum_{m=1}^{3} s(x_i, x_j, x_{ij}^{(m)}) \qquad (21)$$

When $x_{ij}^{(1)} = x_{ij}^{(2)} = x_{ij}^{(3)} = x_i x_j$, the reduced form simplifies to $\alpha_{ijk} x_i x_j x_k$. Otherwise, it is always greater than $\alpha_{ijk} x_i x_j x_k$, and so the reduction is valid. Furthermore, the greatest coefficient introduced is $3 + |\alpha_{ijk}|$. In general however, the coefficient will not be divisible by 3. In that case, we define a new coefficient $\beta_{ijk}^{(m)}$ for each ancilla variable $x_{ij}^{(m)}$ that depends on $\alpha_{ijk} \bmod 3$ such that each $\beta_{ijk}^{(m)}$ is an integer and $\Sigma_{m=1}^{3} \beta_{ijk}^{(m)} = \alpha_{ijk}$. This is elucidated by Table 2, below:

| $\alpha_{ijk} \bmod 3$ | $\beta_{ijk}^{(1)}$ | $\beta_{ijk}^{(2)}$ | $\beta_{ijk}^{(3)}$ |
|---|---|---|---|
| 0 | $\alpha_{ijk}/3$ | $\alpha_{ijk}/3$ | $\alpha_{ijk}/3$ |
| 1 | $(\alpha_{ijk} + 2)/3$ | $(\alpha_{ijk} - 1)/3$ | $(\alpha_{ijk} - 1)/3$ |
| 2 | $(\alpha_{ijk} + 1)/3$ | $(\alpha_{ijk} + 1)/3$ | $(\alpha_{ijk} - 2)/3$ |

We now use the reduction $$\alpha_{ijk} x_i x_j x_k \to \qquad (22)$$

$$(\beta_{ijk}^{(1)} x_{ij}^{(1)} + \beta_{ijk}^{(2)} x_{ij}^{(2)} + \beta_{ijk}^{(3)} x_{ij}^{(3)}) x_k + \sum_{m=1}^{3} (1 + |\beta_{ijk}^{(m)}|) s(x_i, x_j, x_{ij}^{(m)}).$$

If $x_{ij}^{(1)} = x_{ij}^{(2)} = x_{ij}^{(3)} = x_i x_j$, then $s(x_i, x_j, x_k, x_{ij}^{(m)}) = 0$ and this simplifies to $\alpha_{ijk} x_i x_j x_k$. We can rewrite the replacement terms as, $$\sum_{m=1}^{3} (\beta_{ijk}^{(m)} x_{ij}^{(m)} x_k + (1 + |\beta_{ijk}|) s(x_i, x_j, x_{ij})) \qquad (23)$$

In all cases and for each m $$\beta_{ijk}^{(m)} x_{ij}^{(m)} x_k + (1 + |\beta_{ijk}|) s(x_i, x_j, x_{ij}^{(m)}) \geq \beta_{ijk}^{(m)} x_i x_j x_k. \qquad (24)$$

If not $x_{ij}^{(1)} = x_{ij}^{(2)} = x_{ij}^{(3)} = x_i x_j$, strict inequality holds for at least one m and the replacement terms are greater than $\alpha_{ijk} x_i x_j x_k$. Here, the greatest coefficient is $$3 + \max\{3|\beta_{ijk}^{(m)}|, |\alpha_{ijk}|\}. \qquad (25)$$

Finally, we use the same set of ancilla variables $\{\alpha_{ij}^{(m)}\}$ to reduce all of the 3-local terms:

$$\sum_{1 \leq i < j < k \leq N} \alpha_{ijk} x_i x_j x_k = \sum_{1 \leq i < j \leq N} \sum_{k \in K_{ij}} \sum_{m=1}^{3} \beta_{ijk}^{(m)} x_i x_j x_k \rightarrow \quad (26)$$

$$\sum_{1 \leq i \leq j \leq N} \sum_{m=1}^{3} \left( \sum_{k \in K_{ij}} \beta_{ijk}^{(m)} x_{ij}^{(m)} x_k + \delta_{ij}^{(m)} s(x_i, x_j, x_{ij}^{(m)}) \right),$$

where $$\delta_{ij}^{(m)} = 1 + \max \left\{ \sum_{k \in \{k \in K_{ij} | \beta_{ijk}^{(m)} > 0\}} \beta_{ijk}^{(m)}, \sum_{k \in \{k \in K_{ij} | \beta_{ijk}^{(m)} < 0\}} -\beta_{ijk}^{(m)} \right\}$$

and $K_{ij}$ is defined as above with the same constraints. In the reduced form, for every i, j, and m the coefficient of $x_{ij}^{(m)}$ is $3\delta_{ij}^{(m)}$ and for every i and j the coefficient of $x_i x_j$ is $\sum_{m=1}^{3} \delta_{ij}^{(m)}$. The latter will be added to the coefficient $\alpha_{ij}$ of the corresponding quadratic term in the original expression. Thus the control precision needed is $$*\min_{\{K_{ij}\}} \left( \max \left\{ *\max_{i,j,m} (3\delta_{ij}^{(m)}), *\max_{i,j} \left| \alpha_{ij} + \sum_{m=1}^{3} \delta_{ij}^{(m)} \right| \right\} \right). \quad (27)$$

Below we describe a greedy algorithm to find a set of $K_{ij}$ that greatly decreases the control precision needed.

Certain of the classical gadgets described above have already been characterized in the literature. However, such available characterization is not enough to efficiently encode a problem. Below we describe how to efficiently apply these gadgets so that the resulting Hamiltonian meets the demands of available hardware. For simplicity, and because it is the most frequently encountered situation, we will focus first on reductions from 3-local to 2-local, although the techniques are applicable to 4-local to 2-local reduction as well.

When working with a qubit limited encoding, the goal in applying these gadgets is to choose the smallest set of qubit pairs that collapses all 3-local terms. We explain how to cast this problem as canonical set cover and map to 0-1 ILP so that popular optimization software can be leveraged to find the optimal set of collapsing pairs. When working with a control precision limited encoding, the goal is to choose the set of qubits for which the sum of penalty functions contains the smallest maximum coefficient. We approach this problem with a greedy algorithm but later show numerics which validate the efficiency of our technique.

The qubit-optimized application of classical gadgets can be cast as set cover. In this context, the universe U that we seek to cover is the set of 3-local terms that we must collapse. For example, $U = \{x_1 x_2 x_3, x_1 x_4 x_5, x_2 x_3 x_5\}$. Treating each 3-local term as a set of single qubits, we define A as the union of all 2-subsets of each 3-local term. In the example given, $$A = \bigcup_{i=1}^{|U|} \{X \mid X \in 2^{U_i} \wedge |X| = 2\} \quad (28)$$

$$= \{x_1 x_2, x_1 x_3, x_2 x_3\} \cup \{x_1 x_4, x_1 x_5, x_4 x_5\} \cup \{x_2 x_3, x_2 x_5, x_3 x_5\}$$

$$= \{x_1 x_2, x_1 x_3, x_1 x_4, x_1 x_5, x_2 x_3, x_2 x_5, x_3 x_5, x_4 x_5\}.$$

Next, we construct S by replacing each element $A_i$ with the union of proper supersets of $A_i$ in U, $$S = \bigcup_{i=1}^{|A|} \{\{X \mid X \in U \wedge X \supsetneq A_i\}\} \quad (29)$$

$$= \begin{matrix} \{\{x_1 x_2 x_3\}, \{x_1 x_2 x_3\}, \{x_1 x_4 x_5\}, \{x_1 x_4 x_5\}, \\ \{x_1 x_2 x_3, x_2 x_3 x_5\}, \{x_2 x_3 x_5\}, \{x_2 x_3 x_5\}, \{x_2 x_3 x_5\}\} \end{matrix}.$$

In this way, A is the set of products of pairs of qubits $x_i x_j$ that can be used in the reduction, and each element $S_i$ is the set of 3-local terms that the corresponding can be used to reduce. The problem is clearly setcover if we view the 3-local terms as elements (as opposed to sets themselves). Given U and S, find the minimal covering set, i.e. $*\mathrm{argmin}_{\{C \mid C \subseteq S \wedge \cup C = U\}} |C|$. In this form, the problem is easily cast as 0-1 ILP. 0-1 ILP is the problem of finding a Boolean-valued vector v that minimizes the quantity $c^T v$ subject to $Mv \geq b$. In set cover each element of v is a Boolean which says whether or not to include the associated element of S in the cover C. Thus, c is a vector of ones with length equal to the cardinality of S so that the cost function $c^T v$ represents the cardinality of C.

The matrix M multiplies v to set up a system of equations which guarantees that C covers U. Thus, the matrix element $M_{ij}$ is 1 if the $S_j$ contains the $U_i$ and 0 otherwise. Accordingly b is a vector of all ones with length equal to the cardinality of U. Both setcover and 0-1 ILP are well known to be NP-Complete. In fact, the exact problem of cubic to quadratic polynomial binary reduction has been shown to be NP-Complete by analogy with vertex cover.

Figure 3:
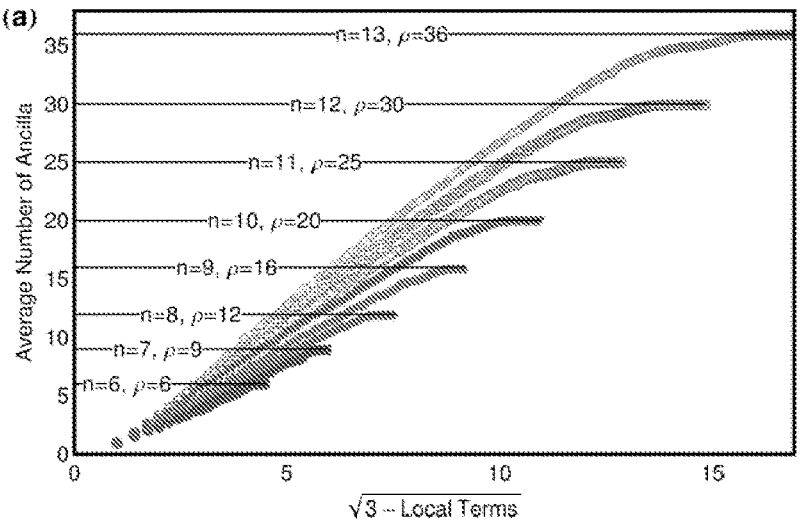
FIGS. 3A-C are graphs showing numerical results of reduction of a 3-local problem limiting the number of total variables.
Figure 3:
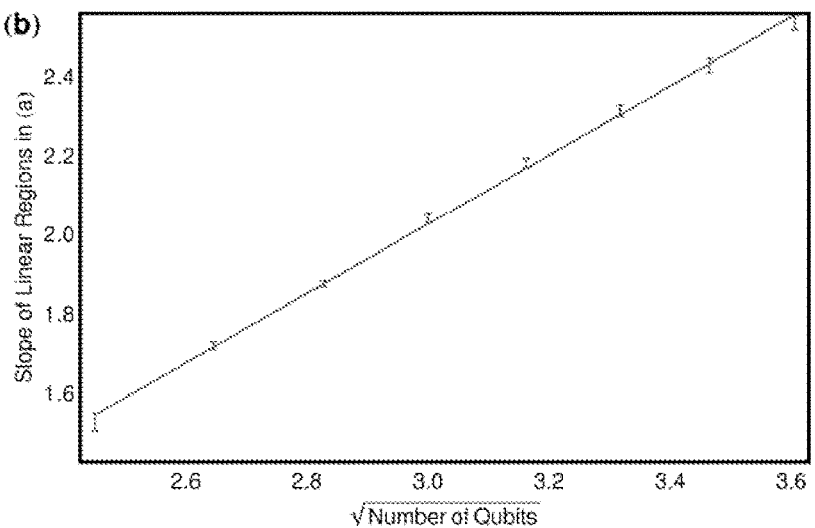
Figure 3:
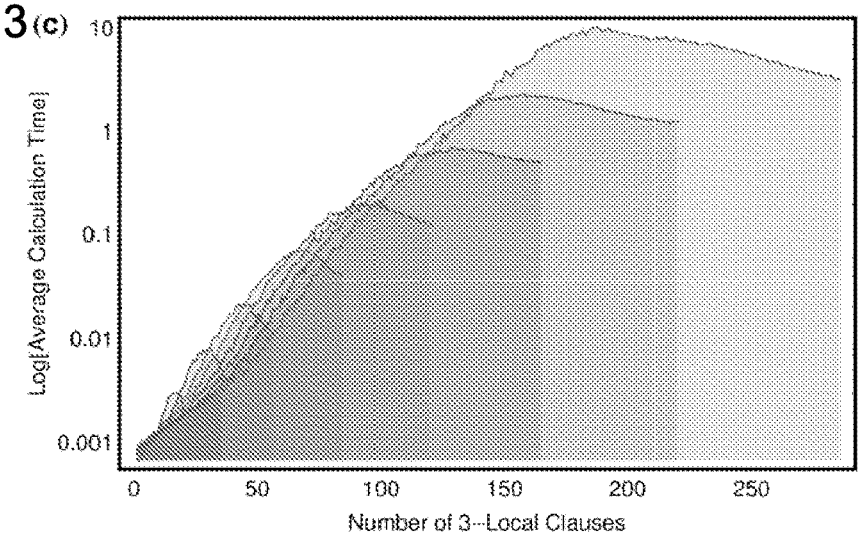

In FIG. 3A-C we show numerics that demonstrate the efficiency of embeddings that make use of this reduction technique. Numerics were collected on randomly generated 3-local polynomial unconstrained binary optimization (PUBO) with n logical qubits and $\lambda$ 3-local clauses. For each value of n, data were collected from 1,000 instances at every possible value of $\lambda$, i.e. $\{\lambda \in \mathbb{Z} \mid 1 \leq \lambda \leq C_3^n\}$. Different colors indicate different values of n ranging between 6 and 12 qubits. FIG. 3A shows the average number of ancilla required for reduction to 2-local versus $\sqrt{\lambda}$. FIG. 3B shows the slope of fits to linear region of aforementioned plot as a function of $\sqrt{n}$. Linear fits in top plots indicate that ancilla requirements scale as $\sqrt{n\lambda}$ until saturating at $\rho(n)$. FIG. 3C is a semi-log plot showing average time in seconds for ILP to solve random instance.

For the case of 3-local to 2-local PUBO reduction, the complexity of a random problem instance is characterized by the number of logical qubits, n, and the number of 3-local clauses, $\lambda$. While ancilla requirements scale as $3\lambda$ for perturbative gadgets and $\lambda$ for exact gadgets without optimized application, numerics from FIGS. 3A and 3B indicate that our ancilla requirements scale as $\sqrt{n\lambda}$ until reaching an asymptote equal to the quarter squares function, defined as $\rho(n) = \lfloor (n-1)^2/4 \rfloor$. In terms of the clause to variable ratio, $r = \lambda/n$, we see that our method scales as $n\sqrt{r}$ whereas the other methods scale as $3nr$ and $nr$, respectively. Thus, we see a quadratic improvement in the number of ancilla required for a given clause to variable ratio but after a certain point, our method saturates and requires no additional ancilla, representing an undefined improvement over other methods.

Unfortunately, we should not expect to do better than a quadratic improvement for extremely large problem sizes because the constant scaling region appears to coincide with the most difficult to reduce problem instances as indicated by the computational time scaling in FIG. 3C. In this regime, exact ILP solvers might take exponentially long to find the minimal cover. The worst case scenario is that the integrality gap of the ILP scales with the logarithm of λ, which would preclude the existence of a polynomial-time relaxation algorithm to approximate the solution beyond a logarithmic factor. There does not seem to be any clear connection between the complexity of a PUBO instance and the complexity of reducing that instance to QUBO; thus, we should have no reason to suspect that an average, hard PUBO problem will take exponential time to reduce to QUBO with ILP. However, for intractably large instances in the difficult clause to variable ratio regime, there exist greedy algorithms in the literature, for instance ReduceMin which finds the pair of indices that appears most in qubit triplets, reduces that pair in all 3-local terms, and repeats this process until all triplets are depleated.

To minimize the control precision, as expressed in Eq. (27), we develop a greedy procedire which chooses the collapsing pairs, $\{K_{ij}\}$. Recall that $K_{ij}$ is the set of indices k such that the term $x_i x_j x_k$ is reduced using the ancilla variable $x_{ij}$ corresponding to the pair of variables $(x_i, x_j)$. In the following pseudo-code we employ the convention that $K(\{i, j\}) = K_{ij}$, $\alpha(\{i, j, k\}) = \alpha_{ijk}$, and $\alpha(\{i, j\}) = \alpha_{ij}$ for ease of exposition.

```
Input: N , α : { {i, j, k} ) | 1 ≤ i < j < k ≤ N} → ℝ
Initialization:
for 1 ≤ i < j ≤ N :
    K ( {i, j} ) = ∅
A = {{i, j, k} | 1 ≤ i < j < k ≤ N ∧ α( {i, j, k} ) ≠ 0}
for a ∈ A :
    B (a) = { {p, q} | {p, q} ⊂ a}
Loop:
while | A |> 0 :
    for a ∈ A :
        for b ∈ B(a):
            Θ 0 = {α(b ∪ {k}) | k ∈ K(b)} ∪ {α(a)}
            Θ⁺ = {θ | θ ∈ Θ ∧ θ > 0}
            Θ⁻ = {θ | θ ∈ Θ ∧ θ < 0}
            w(a, b) = α(b) + 3 + max {Σ_{θ∈Θ}⁺θ, Σ_{θ∈Θ}⁻-θ}
        Γ(a) = *argmin_{b∈B(a)} w(a,b)
        select Δ(a) ∈ *argmin_{γ∈Γ(a)} |{a ∈ A | γ ⊂ a}|
    D = *argmax_{a∈A} w(a, Δ(a))
    select d ∈ D
    K(Δ(d)) = K (Δ(d)) ∪ (d \ Δ(d))
    A = A \ d
Output: K : { {i, j} ) | 1 ≤ i < j ≤ N} → 2^{{i|1≤i≤N}}
```

The above procedure is initialized by setting $K(\{i, j\})$ to the empty set for every pair of variable indices $\{i, j\}$, and by collecting the triplet of variable indices $\{i, j, k\}$ for every 3-local term $\alpha_{ijk} x_i x_j x_k$ with a non-zero coefficient $\alpha_{ijk}$ into the set A. We also introduce the notation B(a) for the set of three pairs of indices contained by a triplet of indices a, e.g. $B(\{i, j, k\}) = \{\{i, j\}, \{i, k\}, \{j, k\}\}$. The remainder of the procedure consists choosing a 3-local term (as represented by the set of indices of its variables d) and a pair of variables contained therein (also represented by their indices Δ(d)) with which to collapse it, which is repeated until such a choice has been made for every term that we wish to collapse. Throughout, the set A contains those terms for which the decision has not been made.

The repeated procedure is as follows: first, for every 3-local term a∈A for a which a pair has not been chosen with which to collapse it and for every pair therein b∈B(a), the cost of collapsing the term a using that pair b is calculated. The cost is defined as $w(a, b) = \alpha(b) + 3 + \max \{\Sigma_{\theta \in \Theta}^{+\theta}, \Sigma_{\theta \in \Theta}^{-\theta}\}$, where Θ is the set consisting of coefficients of terms that the pair b has already been chosen to collapse and the coefficient of the current term a, and Θ⁺ and Θ⁻ are respectively the positive and negative elements thereof. Second, we choose a term d and reduction pair Δ(d) that minimizes the cost w. For each term a∈A we find the set of pair(s) Γ(a) with the least cost of collapsing the term a. Note that here we follow the convention that argmin (argmax) returns the set of arguments for which the function has its minimum (maximum) value over the specified domain, i.e.

$$*\mathrm{argmin}_{x \in X} f(x) = \{x \in X | f(x) = *\mathrm{min}_{x \in X} f(x)\}.$$

If there is more than one such pair, we find which of those is contained in the fewest number of terms in A, those for which a choice has not yet been made. If there is then more than one such pair, a pair Δ(a) is chosen arbitrarily. Having found the minimum cost w(a, Δ(a)) of each term a∈A, we find the set of terms with the minimum cost D and choose one d arbitrarily. Finally, we append the index in d that is not in the reduction pair Δ(d) to K(Δ(d)) and then remove the term d from the set A of terms for which a decision needs to be made. This procedure is repeated until a reduction pair has been chosen for every term, i.e. until A is empty.

Figure 4A:
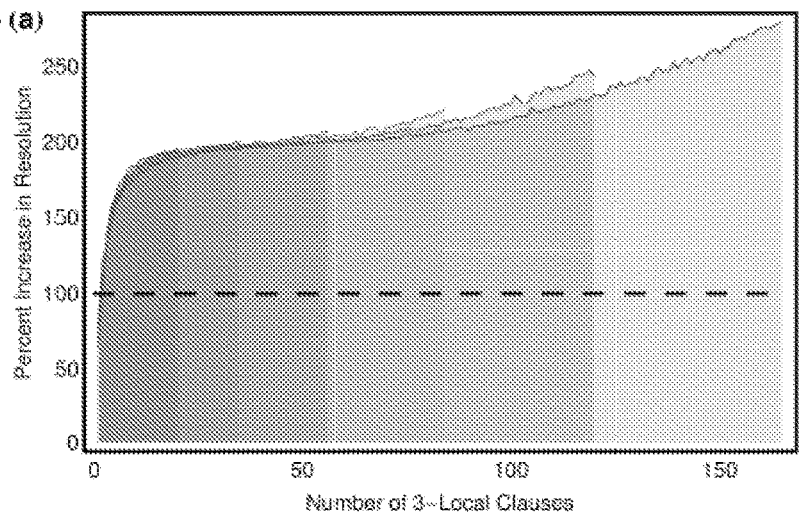
FIGS. 4A-C are graphs showing numerical results of reduction of a 3-local problem limiting the control precision.
Figure 4B:
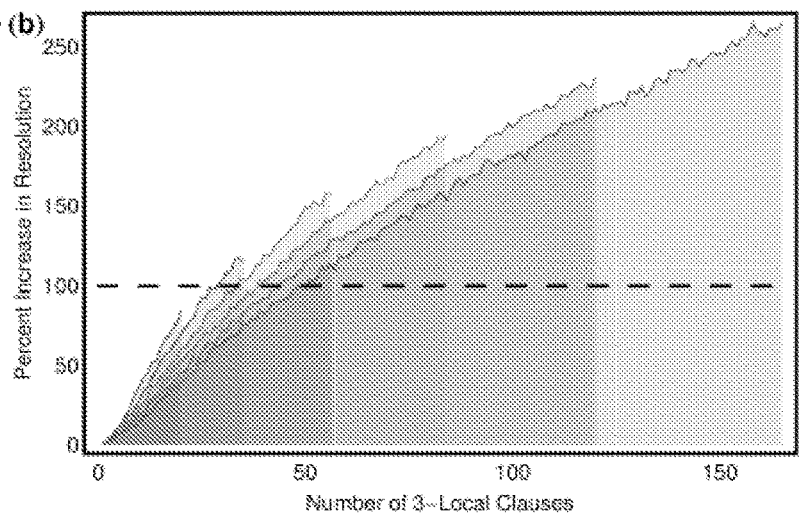
Figure 4C:
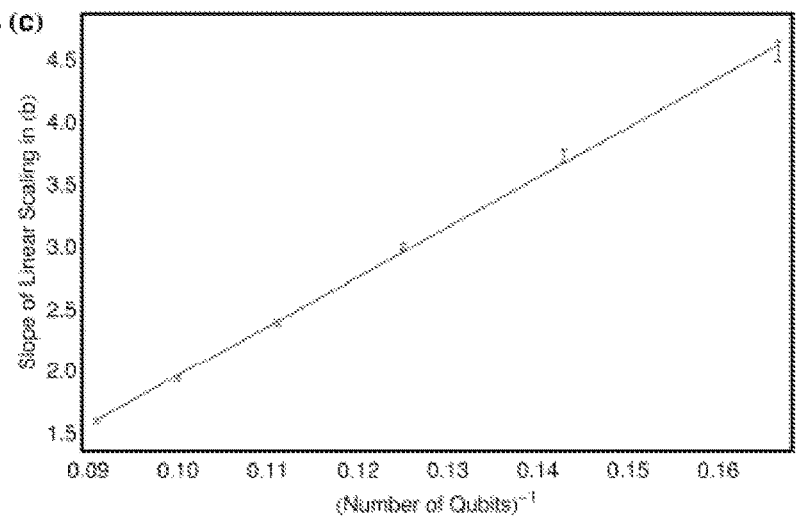

Referring to FIGS. 4A-C, numerics were collected on randomly generated 3-local polynomial unconstrained binary optimization (PUBO) with n logical qubits, λ3-local clauses, and n choose 2, 2-local clauses. For each value of n, data were collected from 1,000 instances at every possible value of λ, i.e. $\{\lambda \in \mathbb{Z} | 1 \leq \lambda \leq C_3^n\}$. Different colors indicate different values of n ranging between 6 and 11 qubits. Integer coefficients for each term were drawn at random from a flat distribution between −8 and 8. With these initial coefficients, a 100% increase in control precision exhausts current D-Wave capabilities (this threshold is indicated with a dotted line). FIG. 4A shows an unoptimized application of reduction gadgets. FIG. 4B shows application of our greedy algorithm indicating that increase in resolution is linear in λ. FIG. 4C shows dependence of greedy algorithm's linear scaling in λ, suggesting that control precision is roughly proportional to λ/n.

While we do not claim that this greedy algorithm is optimal, we present numerical evidence to show that it outperforms the default approach of selecting $K_{ij}$ in a non-systematic fashion. FIGS. 4A-C indicate that our technique significantly reduces the control precision cost of 3-local to 2-local reductions. For instance, with 11 qubits and 50 3-local terms, our approach requires approximately half the control precision that one would need with the default reduction strategy. Randomly choosing qubit pairs to collapse 3-local terms is the approach that many researchers (including the authors) have used in the past to encode problems into the D-Wave One device, even though the device is primarily control precision limited. Our results show that the expected increase in control precision is approximately proportional to λ/n, also known as the clause to variable ratio, r.

Above we have expanded the definition of an exact classical gadget and formalized the difficult problem of efficiently applying these tools. We introduced a novel and useful form of classical gadgets that uses multiple ancilla qubits to decrease the required control precision of compiling arbitrary problems. Using this new gadget we derived Eq. (27), a general expression for the optimal control precision of a 3-local to 2-local reduction. While exactly solving this equation appears extremely difficult, we introduced a simple greedy algorithm which significantly outperforms the status quo. For the problem of minimizing ancilla qubit requirements during 3-local to 2-local reduction, we demonstrated how to map the problem to set cover which allowed us to find minimal ancilla encodings with the use of Integer Linear Programming. These techniques will be very useful to anyone wishing to compile classical problems into realizable Hamiltonians for adiabatic quantum computation. These techniques are applicable to problems in protein folding and related optimization problems of interest to chemistry and biophysics.

APPENDIX

Reducing a Quartic Pseudo-Boolean to Quadratic by Mapping to WMAXSAT

We show how the problem of reducing a quartic pseudo-Boolean to a quadratic one using the minimum number of ancilla bits can be recast as Weighted Max-SAT (WMAX-SAT). An instance of WMAXSAT consists of a set of clauses, each of which is a disjunction of literals, and a function w that assigns a non-negative weight to each clause; the problem is to find an assignment that maximizes the sum of the weights of clauses satisfied thereby.

Consider an arbitrary 4-local term $x_i x_j x_k x_l$. It can be reduced to 2-local in two ways, both of which require two ancilla bits. The first way is to use two ancilla bits that each correspond to the conjunction of two computational bits. For example, the term can be reduced using the ancilla bits $x_{ij}$ and $x_{kl}$, which entails replacing the term $x_i x_j x_k x_l$ with with $x_{ij} x_{kl}$ and adding the penalty functions $s(x_i, x_j, x_{ij})$ and $s(x_k, x_l, x_{kl})$, scaled by the appropriate factor. Similarly, the term can also be reduced using $x_{ik}$ and $x_{jl}$, or $x_{il}$ and $x_{jk}$. The second way is to use an ancilla bit corresponding to the conjunction of three bits, which requires a second ancilla bit. (No quadratic pseudo-Boolean $f(x, y, z, a)$ exists such that $f(x, y, z, a)=0$ if $a=xyz$ and $f(x, y, z, a) \geq 1$ otherwise, which can be shown in a similar manner to that of the proof that the minimum coefficient in the penalty function for the conjunction of two variables is three.) For example, the term $x_i x_j x_k x_l$ can can reduced to 2-local using the ancilla bits $x_{ij}^k$ and $x_{ij}$, where $x_{ij}^k$ corresponds to the conjunction of $x_{ij}$ and $x_k$. (Accordingly, just as the indices of the ancilla bit $x_{ij}$ were unordered, i.e. $x_{ij}=x_{ji}$, so are the subscript indices of the ancilla bit $x_{ij}^k$, i.e. $x_{ij}^k=x_{ji}^k$, though the distinction between subscript and superscript indices must be made. Though in reducing a single term the choice of which pair of computational bits to use for the intermediary ancilla bit is unimportant, when reducing several the same ancilla bit may be used as an intermediary for several ancilla bits each corresponding to the conjunction of three computational bits.) The reduction entails replacing the term by $x_{ij}^k x_l$ and adding the penalty functions $s(x_i, x_j, x_{ij})$ and $s(x_{ij}, x_k, x_{ij}^k)$, scaled by the appropriate factor. There are twelve distinct ancilla bit pairs that can be used to reduce the term using the second way.

Now consider a quartic pseudo-Boolean $$f(x) = \alpha_0 + \sum_{1 \leq i \leq N} \alpha_i x_i + \sum_{1 \leq i < j \leq N} \alpha_{ij} x_i x_j + \sum_{1 \leq i < j < k \leq N} \alpha_{ijk} x_i x_j x_k + \sum_{1 \leq i < j < k < l \leq N} \alpha_{ijkl} x_i x_j x_k x_l \qquad (30)$$

that we would like to reduce to quadratic. Let $T_3$ and $T_4$ be sets of the sets of indices of the variables in the 3-local and 4-local terms with non-zero coefficients, respectively, i.e.

$$T_3 = \{\{i,j,k\} \subset \{1, \ldots, N\} | \alpha_{ijk} \neq 0\} \qquad (31)$$

and $T_4 = \{\{i,j,k,l\} \subset \{1, \ldots, N\} | \alpha_{ijkl} \neq 0\}$. (32)

For each ancilla bit $x_{ij}$ that represents a conjunction of two computational bits, we introduce a Boolean variable $r_{ij} \in \{\text{true, false}\}$ that represents its actual use. For each triplet of computational bits $\{x_i, x_j, x_k\}$, we introduce a Boolean variable $r_{ijk} \in \{\text{true, false}\}$ corresponding to the use of an ancilla corresponding to their conjunction, regardless of which intermediate ancilla bit was used. While the choice of intermediate ancilla bit must be made when doing the reduction, the minimum set of ancilla bits used in a reduction cannot contain two distinct ancilla bits corresponding to the conjunction of the same three ancilla variables and so here there is no need to make the distinction. Let $$R_2 = \left\{ r_{ij} \; \middle| \; \{i, j\} \subset \bigcup_{t \in T_3 \cup T_4} t \right\}, \qquad (33)$$

$$R_3 = \left\{ r_{ijk} \; \middle| \; \{i, j, k\} \subset \bigcup_{t \in T_4} t \right\}, \qquad (34)$$

and $$R = R_2 \cup R_3. \qquad (35)$$

There are three sets of clauses that must be included. First, the goal is to minimize the number of ancilla bits used in the reduction, and so for each variable representing the use of a unique ancilla bit we include the single-literal clause consisting of its negation, and assign to each such clause a weight of 1:

$$\mathcal{F} = \{(\overline{r_{ij}}) | \{i,j\} \in R_2\} \cup \{(\overline{r_{ijk}}) | \{i,j,k\} \in R_3\} \qquad (36)$$

and $w(C)=1$ for every $C \in \mathcal{F}_1$. This first set consists of so-called soft clauses. The remaining two sets of clauses $\mathcal{F}_2$ and $\mathcal{F}_3$ consist of hard clauses, those that must be satisfied. This is ensured by assigning to every hard clause a weight greater than the sum of the weights of al the soft clauses. Here, we set $w(C)=|\mathcal{F}_1|+1=|R|+1$ for every $C \in \mathcal{F}_2 \cup \mathcal{F}_3$. Note that $$|R| \leq \binom{N}{3} + \binom{N}{2} = \frac{n(n^2-1)}{6}.$$

Second, we must ensure that for each ancilla bit used that corresponds to the conjunction of three computational bits there is at least one intermediate ancilla bit that can be used in its construction, i.e.

$$(r_{ijk} \rightarrow (r_{ij} \vee r_{ik} \vee r_{jk})) \equiv (\overline{r_{ijk}} \vee r_{ij} \vee r_{ik} \vee r_{jk}). \qquad (37)$$

Let $$\mathcal{F}_2 = \{(\overline{r_{ijk}} \vee r_{ij} \vee r_{ik} \vee r_{jk}) | \{i,j,k\} \in R_3\}. \qquad (38)$$

Third, we must ensure that the set of ancilla bits used reduces all the cubic and quartic terms. A cubic term $x_i x_j x_k$ can be reduced using $x_{ij}, x_{ik}$, or $x_{jk}$, i.e. if $(r_{ij} \vee r_{ij} \vee r_{jk})$. Note that while an ancilla bit corresponding to the term itself can be used to reduce it to 1-local, that ancilla bit can only be constructed using one of the three ancilla bits mentioned, and any one of those three is sufficient to reduce the term to quadratic. A quartic term $x_i x_j x_k x_l$ can be reduced using one of twelve ancilla bits (though each requires an intermediary). These twelve can be partitioned into four triplets by the triplet of variables whose conjunction they correspond to, i.e. by the Boolean variable that represents the use of any one. Thus the quartic term can be reduced to quadratic if $(r_{ijk} \vee r_{ijl} \vee r_{ikl} \vee r_{jkl})$. It can also be reduced using two ancilla bits that correspond to the conjunctions of disjoint pairs of computational bits, i.e. if $((r_{ij} \wedge r_{kl}) \vee (r_{ik} \wedge r_{jl}) \vee (r_{il} \wedge r_{jk}))$. These clauses must be written in conjunctive normal form:

$$((r_{ij} \wedge r_{kl}) \vee (r_{ik} \wedge r_{jl}) \vee (r_{il} \wedge r_{jk}) \vee r_{ijk} \vee r_{ijl} \vee r_{ikl} \vee r_{jkl}) \equiv \bigwedge_{\substack{y_1 \in \{r_{ij}, r_{kl}\} \\ y_2 \in \{r_{ik}, r_{jl}\} \\ y_3 \in \{r_{il}, r_{jk}\}}} (y_1 \vee y_2 \vee y_3 \vee r_{ijk} \vee r_{ijl} \vee r_{ikl} \vee r_{jkl}).$$

Let $$\mathcal{F}_3 = \{(r_{ij} \vee r_{ij} \vee r_{jk}) \mid \{i, j, k\} \in T_3\} \cup \bigcup_{\{i,j,k,l\} \in T_4} \bigcup_{\substack{y_1 \in \{r_{ij}, r_{kl}\} \\ y_2 \in \{r_{ik}, r_{jl}\} \\ y_3 \in \{r_{il}, r_{jk}\}}} (y_1 \vee y_2 \vee y_3 \vee r_{ijk} \vee r_{ijl} \vee r_{ikl} \vee r_{jkl}). \quad (39)$$

Finally, let $\mathcal{F} = \mathcal{F}_1 + \mathcal{F}_2 + \mathcal{F}_3$. The WMAXSAT instance is specified by $\mathcal{F}$ and $$w(C) = \begin{cases} 1 & C \in \mathcal{F}_1 \\ |R| + 1 & C \in \mathcal{F}_2 \cup \mathcal{F}_3 \end{cases}.$$

Maximum Number of Ancilla Bits Needed to Reduce a Cubic Pseudo-Boolean to Quadratic

We prove here that the minimum number of ancilla variables needed to reduce all 3-local terms over n variables to 2-local is $$\left\lfloor \frac{(n-1)^2}{4} \right\rfloor,$$

and therefore that the minimum number of ancilla variables needed to reduce any set of 3-local terms over n variables is upper-bounded by the same.

The basis of the proof is Mantel's Theorem: A triangle-free graph with n vertices can have at most $$\left\lfloor \frac{n^2}{4} \right\rfloor$$

vertices. We identify a set of ancilla bits A used to reduce locality with the edge set E(A) of a graph G(A) whose vertices $V = \{v_i | 1 \leq i \leq N\}$ correspond to the computational variables and in which there is an edge between any two vertices $v_i$ and $v_j$ if and only if the anncilla bit $x_{ij}$ representing the conjunction of the corresponding computational bits $x_i$ and $x_j$ is used. (In reducing a cubic pseudo-Boolean to a quadratic, only ancilla bits of this type are needed.) The set of ancilla bits A can be used to reduce all possible 3-local terms if and only if for every set of three computational bits there is at least one ancilla bit in A corresponding to the conjunction of any two. In graph-theoretic terms, A can be used to reduce all 3-local terms if and only if every possible triangle in the complete graph with the same the vertex set V contains at least one edge in E(A), or equivalently if the complement $E^C(A)$ of $E(A)$ is triangle-free. Suppose that the set of ancilla bits A reduces all 3-local terms. Then by Mantel's Theorem $$|E^C(A)| \leq \left\lfloor \frac{N^2}{4} \right\rfloor.$$

Because $$|E(A)| + |E^C(A)| = \binom{N}{2},$$

this yields $$|E(A)| = \binom{N}{2} - |E^C(A)| \quad (40)$$

$$\geq \binom{N}{2} - \left\lfloor \frac{N^2}{4} \right\rfloor. \quad (41)$$

Let $N = 2m + b$, where $$m = \left\lfloor \frac{N}{2} \right\rfloor \in \mathbb{Z}$$

and $b = N - 2m \in \{0, 1\}$. Then $$|E(A)| \geq \binom{2m+b}{2} - \left\lfloor \frac{(2m+b)^2}{4} \right\rfloor \quad (42)$$

$$= \frac{(2m+b)(2m+b-1)}{2} - \left\lfloor m^2 + mb + \frac{b^2}{4} \right\rfloor \quad (43)$$

$$= 2m^2 + 2mb - m + \frac{b^2 - b}{2} - (m^2 + mb) \quad (44)$$

$$= m^2 + mb - m \quad (45)$$

$$= \left\lfloor m^2 + mb - m + \frac{b^2 - 2b + 1}{4} \right\rfloor \quad (46)$$

$$= \left\lfloor \frac{(2m+b-1)^2}{4} \right\rfloor \quad (47)$$

$$= \left\lfloor \frac{(N-1)^2}{4} \right\rfloor. \quad (48)$$

Furthermore, by construction we show that the minimal set reaches this bound. Let $E = \{\{v_i, v_j\} | (1 \leq i < j \leq \lceil N/2 \rceil) \vee (\lceil N/2 \rceil + 1 \leq i < j \leq N\}$. That is, partition the vertices into sets of as equal size as possible and include an edge between every pair within each set. Let $N = 2m + b$ as above. The total number of edges constructed in this way is $$\binom{\lceil N/2 \rceil}{2} + \binom{\lfloor N/2 \rfloor}{2} = \binom{m+b}{2} + \binom{m}{2} \quad (49)$$

-continued $$= \frac{(m+b)(m+b-1)}{2} + \frac{m(m-1)}{2} \quad (50)$$

$$= m^2 + mb - m \quad (51)$$

$$= \left\lfloor \frac{(N-1)^2}{4} \right\rfloor. \quad (52)$$

It is to be understood that the foregoing description is intended to illustrate and not to limit the scope of the invention, which is defined by the scope of the appended claims. Other embodiments are within the scope of the following claims.

What is claimed is:

1. A method for use in solution of a problem of determining values of a set of problem variables by a quantum processor that has limitations on coupling between hardware elements representing quantum bits, the method comprising:
accepting a specification of the problem that includes a specification of a set of terms where each of at least some of the terms corresponds to a product of at least three problem variables and is associated with a non-zero coefficient;
selecting a plurality of tuples of problem variables, each tuple of problem variables corresponding to a set of one or more ancilla variables, the selecting including applying an optimization procedure to the specification of the set of the terms to determine the selected tuples of problem variables, and the optimization procedure using an optimality criterion based at least in part on the limitations on coupling between hardware elements including a limitation on a precision of said coupling, wherein
said limitation on a precision of said coupling includes a limitation on a control precision corresponding to a range of distinguishable values that are attainable for controlling a coefficient that represents a degree of a coupling between hardware elements, the distinguishable values comprising integral multiples of a fixed step size up to a maximum magnitude; and
transforming the accepted problem specification according to the selected tuples of problem variables to form a modified problem specification for use in configuring the quantum processor and solution of problem, the modified problem specification including terms where each term corresponds to a product of a problem variable to the accepted problem specification and an ancilla variable corresponding to a tuple of problem variables of the accepted problem specification.

2. The method of claim 1 wherein each tuple of at least some of the selected tuples of the problem variables consists of a pair of the problem variables.

3. The method of claim 1 wherein at least some of the sets of ancilla variables corresponding to respective ones of the selected tuples of problem variables each consists of a single ancilla variable.

4. The method of claim 1 wherein at least some of the sets of ancilla variables corresponding to respective ones of the selected tuples of problem variables each comprises multiple ancilla variables.

5. The method of claim 1 wherein accepting the specification of a problem comprises accepting a specification of a Polynomial Unconstrained Binary Optimization (PUBO) problem.

6. The method of claim 1 wherein the quantum processor has a limited number of hardware elements, each associated with a different problem variable.

7. The method of claim 6 wherein the limited number of hardware elements comprise a limited number of quantum bit elements.

8. The method of claim 6 wherein selecting a plurality of tuples of problem variables comprises selecting said tuples according to a number of resulting ancilla variables required to transform the problem specification.

9. The method of claim 8 wherein each set of ancilla variables corresponding to a selected tuple of problem variables consists of one corresponding ancilla variable.

10. The method of claim 8 wherein selecting the plurality of tuples of problem variables comprises applying an optimal set covering procedure.

11. The method of claim 8 wherein selecting the plurality of tuples of problem variables comprises applying a 0-1 integer Linear Programming (LP) procedure.

12. The method of claim 1 wherein each set of ancilla variables corresponding to a selected tuple of problem variables consists of one corresponding ancilla variable.

13. The method of claim 1 wherein each set of ancilla variables corresponding to a selected tuple of problem variables comprises three or more corresponding ancilla variables.

14. The method of claim 1 wherein selecting the plurality of tuples of problem variables comprises applying a 0-1 integer Linear Programming (LP) procedure.

15. The method of claim 1 wherein selecting the plurality of tuples of problem variables comprises applying a greedy assignment procedure.

16. The method of claim 1 further comprising:
configuring the quantum processor according to the modified problem specification.

17. The method of claim 16 further comprising:
operating the quantum processor configured according to the modified problem specification; and
providing a specification of a problem solution determined from a state of the quantum processor after the operating.

18. The method of claim 17 wherein operating the quantum processor comprises operating said quantum processor according to a quantum annealing procedure.

19. A quantum computing system comprising:
a quantum processor that has limitations on coupling between hardware elements representing quantum bits for use in solution of a problem of determining values of a set of problem variables, the quantum processor configured to:
accept a specification of the problem that includes a specification of a set of terms where each of at least some of the terms corresponds to a product of at least three problem variables and is associated with a non-zero coefficient;
select a plurality of tuples of problem variables, each tuple of problem variables corresponding to a set of one or more ancilla variables, the selecting including applying an optimization procedure to the specification of the set of the terms to determine the selected tuples of problem variables, and the optimization procedure using an optimality criterion based at least in part on the limitations on coupling between hardware elements including a limitation on a precision of said coupling, wherein said limitation on a precision of said coupling includes a limitation on a control precision corresponding to a range of distinguishable values that are attainable for controlling a coefficient that represents a degree of a coupling between hardware elements, the distinguishable values comprising integral multiples of a fixed step size up to a maximum magnitude; and transform the accepted problem specification according to the selected tuples of problem variables to form a modified problem specification for use in configuring the quantum processor and solution of problem, the modified problem specification including terms where each term corresponds to a product of a problem variable to the accepted problem specification and an ancilla variable corresponding to a tuple of problem variables of the accepted problem specification.

20. Software for use in solution of a problem of determining values of a set of problem variables by a quantum processor that has limitations on coupling between hardware elements representing quantum bits, the software comprising instructions stored on a non-transitory computer-readable medium for causing a compiler to:

accept a specification of the problem that includes a specification of a set of terms where each of at least some of the terms corresponds to a product of at least three problem variables and is associated with a non-zero coefficient;

select plurality of tuples of problem variables, each tuple of problem variables corresponding to a set of one or more ancilla variables, the selecting including applying an optimization procedure to the specification of the set of the terms to determine the selected tuples of problem variables, and the optimization procedure using an optimality criterion based at least in part on the limitations on coupling between hardware elements including a limitation on a precision of said coupling, wherein said limitation on a precision of said coupling includes a limitation on a control precision corresponding to a range of distinguishable values that are attainable for controlling a coefficient that represents a degree of a coupling between hardware elements, the distinguishable values comprising integral multiples of a fixed step size up to a maximum magnitude; and transform the accepted problem specification according to the selected tuples of problem variables to form a modified problem specification for use in configuring the quantum processor and solution of problem, the modified problem specification including terms where each term corresponds to a product of a problem variable to the accepted problem specification and an ancilla variable corresponding to a tuple of problem variables of the accepted problem specification.

21. The method of claim 18 wherein operating the quantum processor comprises operating said quantum processor according to an adiabatic quantum computation procedure.

22. A method for use in solution of a problem of determining values of a set of problem variables by a quantum processor that has limitations on coupling between hardware elements representing quantum bits, the method comprising:

accepting a specification of the problem that includes a specification of a set of terms where each of at least some of the terms corresponds to a product of at least three problem variables and is associated with a non-zero coefficient;

selecting a plurality of tuples of problem variables, each tuple of problem variables corresponding to a set of one or more ancilla variables, the selecting including applying an optimization procedure to the specification of the set of the terms to determine the selected tuples of problem variables, and the optimization procedure using an optimality criterion based at least in part on the limitations on coupling between hardware elements including a limitation on a precision of said coupling, wherein said limitation on a precision of said coupling includes a limitation on a control precision corresponding to a range of distinguishable values that are attainable for controlling a coefficient that represents a degree of a coupling between hardware elements, and wherein the optimality criterion is configured to reduce a control precision cost of a reduction in locality associated with the selected tuples of problem variables compared to a control precision cost of a reduction in locality associated with a random selection of tuples of problem variables; and transforming the accepted problem specification according to the selected tuples of problem variables to form a modified problem specification for use in configuring the quantum processor and solution of problem, the modified problem specification including terms where each term corresponds to a product of a problem variable to the accepted problem specification and an ancilla variable corresponding to a tuple of problem variables of the accepted problem specification.

* * * * *